Aug. 8, 1944.  C. MACBETH  2,355,456
RESILIENT MOUNTING
Filed Sept. 21, 1942  4 Sheets-Sheet 1

Inventor
Colin Macbeth
By Glascock Downing Seebold
Attys

Aug. 8, 1944.  C. MACBETH  2,355,456
RESILIENT MOUNTING
Filed Sept. 21, 1942  4 Sheets-Sheet 2

Inventor
Colin Macbeth
By Glascock Downing Aubold
Attys.

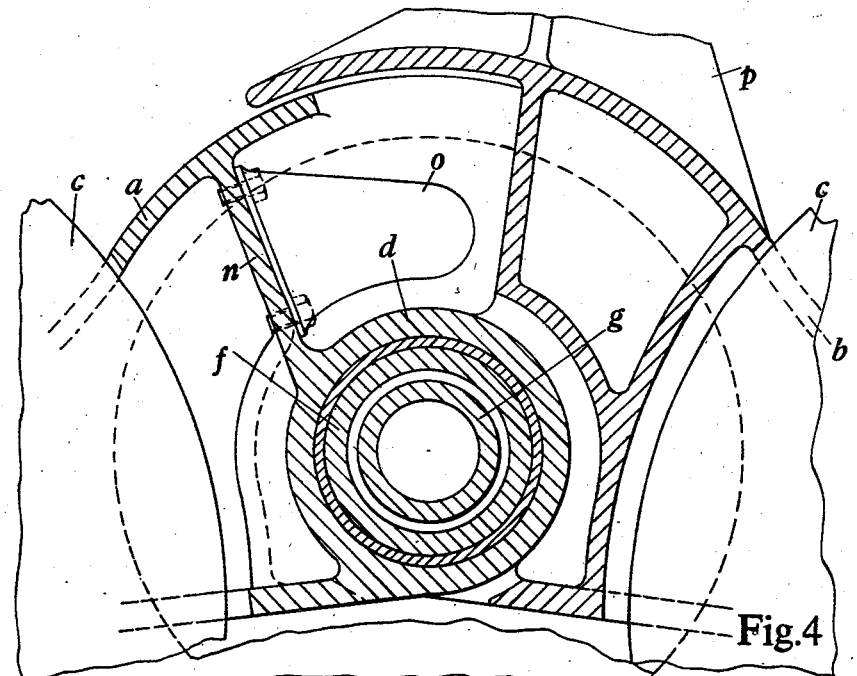
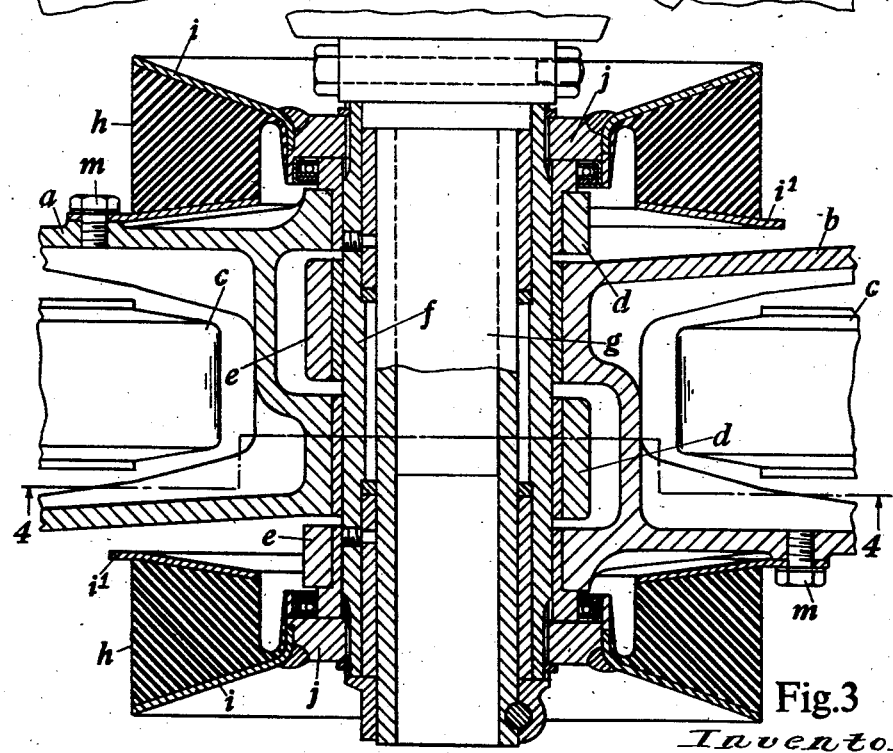
Fig. 4
Fig. 3

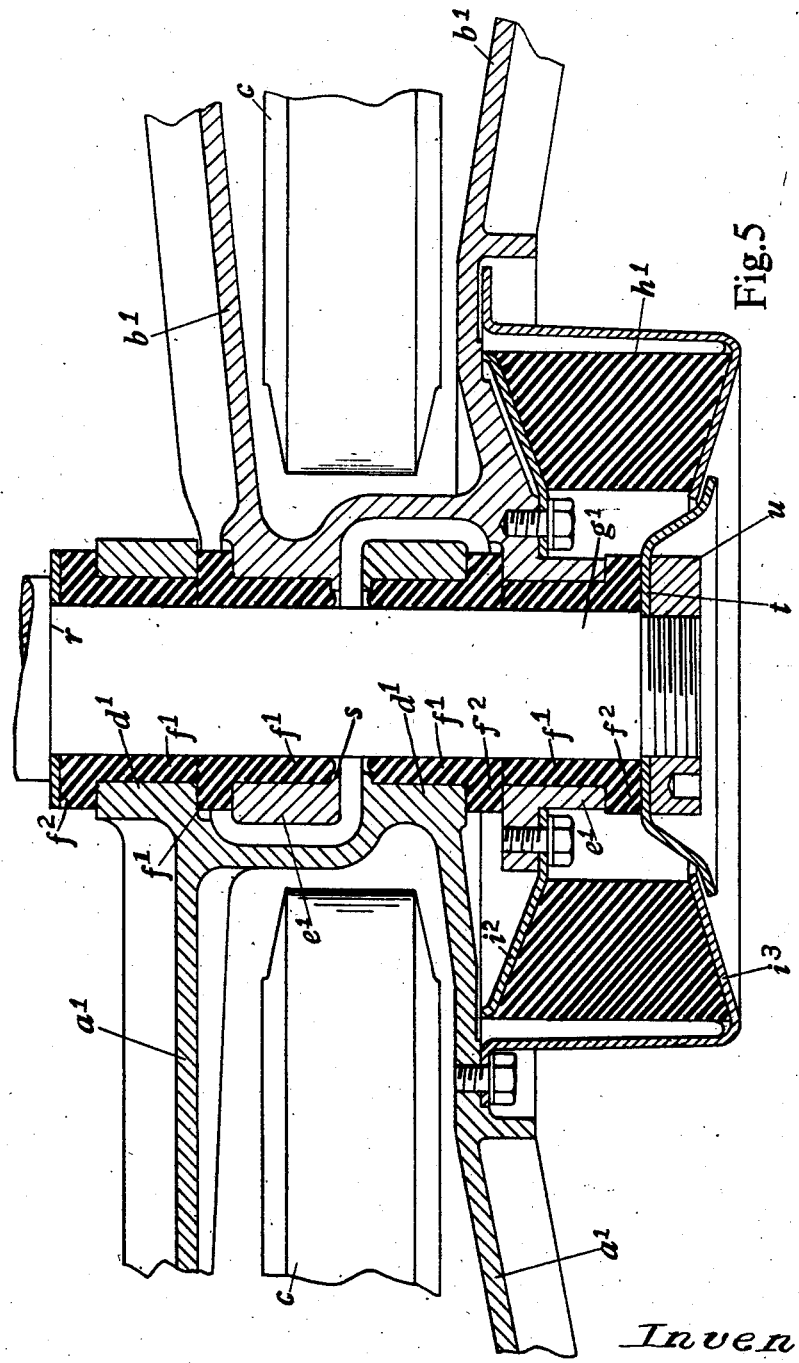

Patented Aug. 8, 1944

2,355,456

UNITED STATES PATENT OFFICE 2,355,456

RESILIENT MOUNTING

Colin Macbeth, Birmingham, England, assignor of one-half to Vivian Graham Loyd, Camberley, England Application September 21, 1942, Serial No. 459,122 In Great Britain September 5, 1941

4 Claims. (Cl. 267—21)

This invention relates to resilient mountings for parts of mechanically propelled vehicles and other machinery, the mountings being of the kind in which a rubber or like resilient annular disc, or each of a plurality of such discs, is attached at its side faces to metallic members having freedom of relative angular movement, and in which the disc or discs is or are adapted to exert torsional resistance to such movement. In particular the invention relates to mountings for the idler rollers used in conjunction with the endless tracks of track laying vehicles.

The object of the invention is to provide improved mountings of the kind aforesaid.

The invention comprises the combination of a pair of relatively and independently movable arms having a common pivot axis and having their outer ends adapted to carry rollers or to be connected to any articulated or other movable member to be controlled, and an annular rubber or like resilient disc or a plurality of such discs adapted to control relative angular movements of the arms.

The invention also comprises a combination as aforesaid in which the arms are mounted on a bush which is adapted to be mounted on a fixed pivot pin.

The invention also comprises a combination as aforesaid in which a rubber cushion is mounted between extensions of the arms, and in which a protective enclosure is provided for the cushion.

Further the invention comprises a combination as aforesaid in which one or each of the arms is provided with an extension on which an additional roller or rollers can be mounted.

In the accompanying sheets of explanatory drawings:

Figure 3 is a sectional plan taken on the line 3—3 of Figure 1 and drawn to a larger scale than the latter figure.

Figure 4 is a section taken on the line 4—4 of Figure 3 looking in the direction of the arrows.

Figure 5 is a view similar to Figure 3 illustrating a modified form of the invention.

Figure 1:
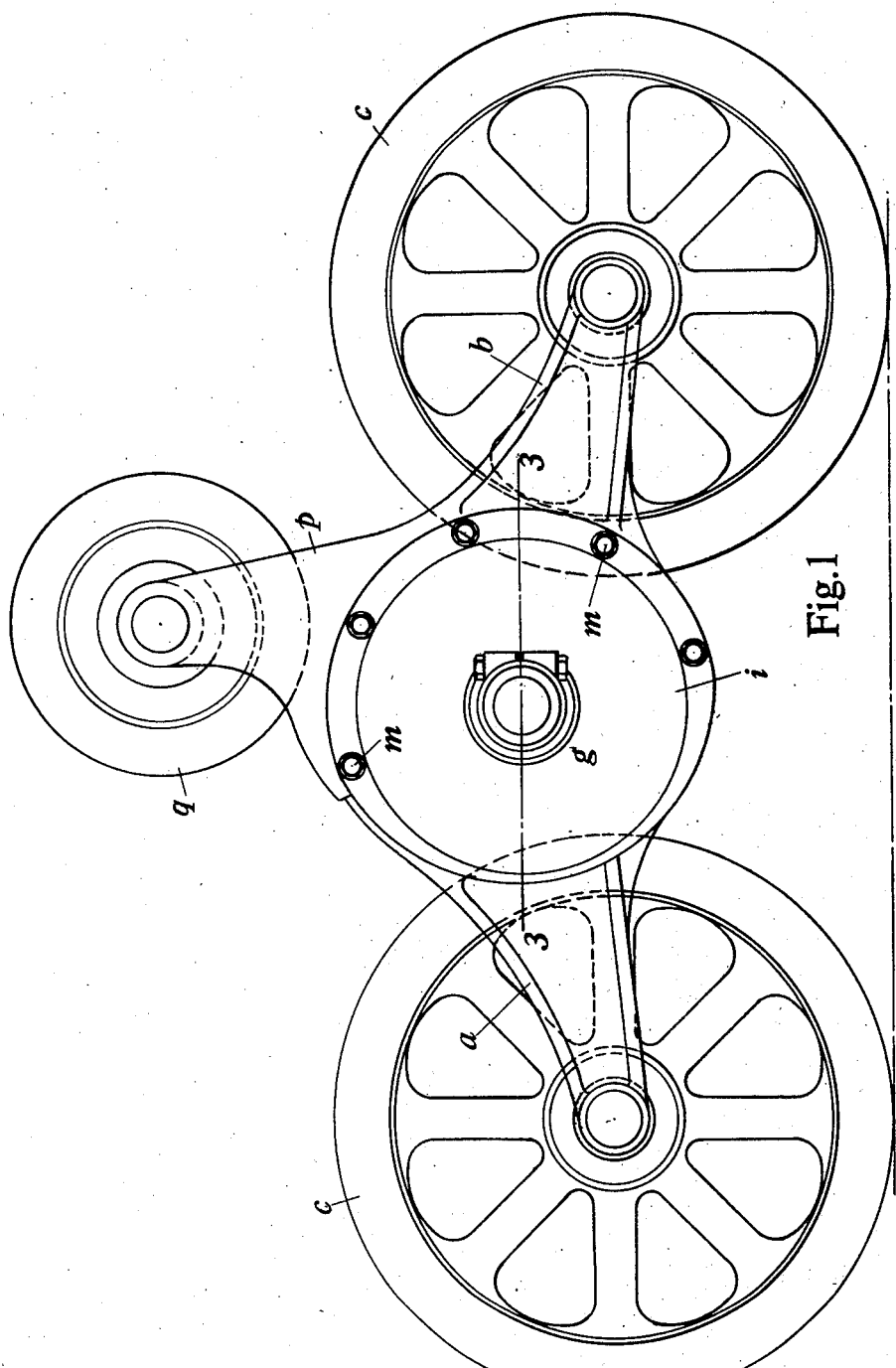
Figures 1 and 2 are respectively a side elevation and a plan illustrating the invention applied to a so-called bogie for resiliently supporting that portion of the endless track of a track laying vehicle which is in contact with the ground.
Figure 2:
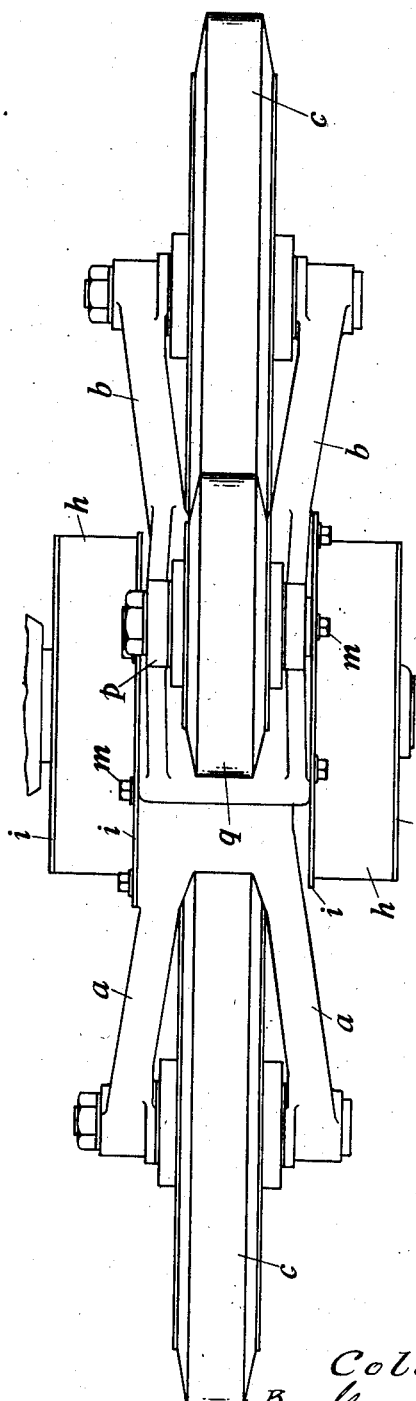

In carrying the invention into effect as shown in Figures 1 to 4, I employ a pair of arms $a$, $b$ each adapted to carry at its outer end a roller or rollers as $c$ for engaging the inner surface of the lower portion of the endless track (not shown). The two arms $a$, $b$ are adapted at one pair of adjacent ends to have a common pivot axis. Each arm may be made as a casting or forging, or it may be fabricated from a number of component parts which are secured together by welding or otherwise. Also each arm may comprise a single member, or two or more members arranged parallel with each other, and is adapted for the mounting of the corresponding roller or rollers at its outer side or at the outer sides of or between its members. The adjacent ends of the two arms $a$, $b$ are shaped in the form of hollow cylindrical hubs $d$, $e$. Moreover in order that the two arms $a$, $b$ may be mounted in the same plane the hubs $d$, $e$ are gapped so that a portion or portions of each hub may lie between portions of the other hub in the manner of a knuckle joint.

The two arms $a$, $b$ are mounted on a hollow cylindrical metal bush $f$ which passes through their hubs $d$, $e$, and the bush is adapted to be mounted (with freedom of angular movement) on a supporting pivot pin $g$ attached to the body of the vehicle.

In combination with the arms $a$, $b$ and bush $f$ I preferably employ two rubber or like resilient annular discs $h$, each of which is shaped as described in British Patent Specification No. 363,039 (Adams Patent Suspension Company Limited and Colin Macbeth), the side faces being mutually inclined so that the thickness of the disc is greater at its outer periphery than at its inner periphery. Also to the side faces of each disc $h$ are secured by vulcanising or otherwise metal plates or flanges $i$ and $i^1$. As shown, the two discs $h$ are mounted at the opposite ends of the bush $f$. The outer plate $i$ of the two plates $i$ and $i^1$ associated with each disc $h$ is splined or otherwise secured to the adjacent end of the bush through the agency of a hub portion $j$, and is held in position by any convenient means. The inner plate $i^1$ of the two plates associated with each disc $h$ is secured to the adjacent face of the corresponding arm $a$ or $b$ by screws as $m$, rivets, key-like projections or other convenient means.

With the arrangement above described, both discs $h$ are stressed when either arm $a$ or $b$ moves relatively to the other, as the bush $f$ is free to move about its supporting pivot pin, and the load is therefore equally shared by the two discs.

To limit the amount of relative angular freedom of the two arms $a$, $b$ in the example shown in Figures 1 to 4, a radial or like extension $n$ is provided on the hub portion $d$ or $e$ of each, and on the face of one of these extensions is secured a rubber cushion $o$, this latter being preferably shaped and adapted to co-operate with the other extension as described in my specification of British Letters Patent No. 503,341. Also one or each of the extensions $n$ is shaped to a box-like form so as to form a protective enclosure for the cushion $o$ as shown in Figure 4, one of the extensions being adapted to telescope in and out of the other when relative movements of the arms $a, b$ occur.

Further I may provide on the hub portion of one or each of the arms $a, b$ another extension $p$ on which can be mounted another roller or rollers as $q$ for supporting the upper or idle portion of the track. The roller or rollers as $q$ may be so disposed as to take up track slack arising from deflections under load of the supporting rollers $c$.

For some purposes it is not necessary to employ the metal bush above mentioned, or alternatively instead of a metal bush a rubber or like bush, or a series of such bushes may be used as shown, for example, in Figure 5. In this example I employ a pair of arms $a^1, b^1$ which are pivoted on a common axis. Each arm may comprise a pair of spaced side members adapted at their outer ends to carry an idler roller $c$ between them as shown. Or each arm may consist of a single member adapted at its outer end to carry a pair of idler rollers situated coaxially at the opposite sides of the arm. At its pivoted end each of the arms $a^1, b^1$ is bifurcated to provide a pair of eyes so that when the two arms are assembled the said ends overlap in the manner of a knuckle joint, the eyes of the arm $a^1$ being indicated by $d^1$, and those of the arm $b^1$ by $e^1$.

The two arms $a^1, b^1$ may be adapted to be mounted directly on a fixed pivot pin $g^1$ on which each arm can rock independently of the other. Alternatively, and as shown a rubber or like resilient bush $f^1$ may be inserted in each of the eyes $d^1, e^1$ of the two arms, each bush being formed with an external flange $f^2$ at one end. The four bushes $f^1$ are adapted to fit the eyes $d^1, e^1$ of the arms and the fixed pivot pin $g^1$ on which they are mounted. At the inner end of the pin $g^1$ is a shoulder $r$ against which the flange $f^2$ on the adjacent bush $f^1$ of the arm $a^1$ can abut. The flange $f^2$ of the next bush $f^1$ of the other arm $b^1$ lies between the two arms $a^1, b^1$ and its flangeless end abuts against an internal shoulder $s$ in its arm. The other two bushes $f^1$ are similarly arranged, but in this case the flange $f^2$ of the bush adjacent to the outer end of the pivot pin $g^1$ abuts against a plate $t$ secured to the said pin by a nut $u$ engaging a screw threaded portion of the pin.

At the outer sides of the two arms $a^1, b^1$, is mounted a single controlling rubber or like resilient annular disc $h^1$ which is similar to either of those above described. One face of this disc $h^1$ is bonded to a metal plate $i^2$ which is secured by screws to the outer eye $e^1$ of the arm $b^1$, and the other face of the disc is bonded to a dished metal plate $i^3$ which encloses the periphery of the disc and which is secured by screws to the other arm $a^1$.

The arrangement above described is such that on tightening the nut $u$ on the pivot pin $g^1$ and the screws which secure the outer disc plates $i^3$, the rubber or like bushes $f^1$ are compressed, causing them to grip the surfaces of the pin $g^1$ and the arm eyes $d^1, e^1$.

Whilst the invention is primarily intended for use on track-laying vehicles, it may be applied to other analogous uses in which the outer ends of the arms are adapted to be connected to an articulated or other member to be controlled, as, for example, in the suspensions of vehicle road wheels. Also subordinate details of construction or arrangement can be varied to suit different requirements.

Having thus described my invention what I claim as new and desire to secure by Letters Patent is:

1. A resilient mounting comprising a supporting pivot pin, a pair of arms relatively and independently movable about said pin, spaced plates arranged about said pin and having internal and external edges, a resilient disc facially bonded with said plates, means connecting the external edge of one of said plates to one of said arms, and means connecting the internal edge of the other plate with the other arm.

2. A resilient mounting comprising a supporting pivot pin, a pair of arms relatively and independently movable about said pin, spaced plates arranged about said pin and having internal and external edges, a resilient disc facially bonded with said plates, means connecting the external edge of one of said plates to one of said arms, means connecting the internal edge of the other plate with the other arm, and a bush for said arms and mounted on said pivot pin.

3. A resilient mounting comprising a supporting pivot pin, a pair of arms relatively and independently movable about said pin, spaced plates arranged about said pin and having internal and external edges, a resilient disc facially bonded with said plates, means connecting the external edge of one of said plates to one of said arms, means connecting the internal edge of the other plate with the other arm, resilient bushes between said pivot pin and said arms and between said arms, and means for effecting end-wise compression of said resilient bushes whereby the latter are caused to grip the arms and the pivot pin.

4. A resilient mounting comprising a supporting pivot pin, a pair of arms relatively and independently movable about said pin, spaced plates arranged about said pin and having internal and external edges, a resilient disc facially bonded with said plates, means connecting the external edge of one of said plates to one of said arms, means connecting the internal edge of the other plate with the other arm, telescopically related extensions on said arms, and a resilient cushion between said extensions.

COLIN MACBETH.